UNITED STATES PATENT OFFICE.

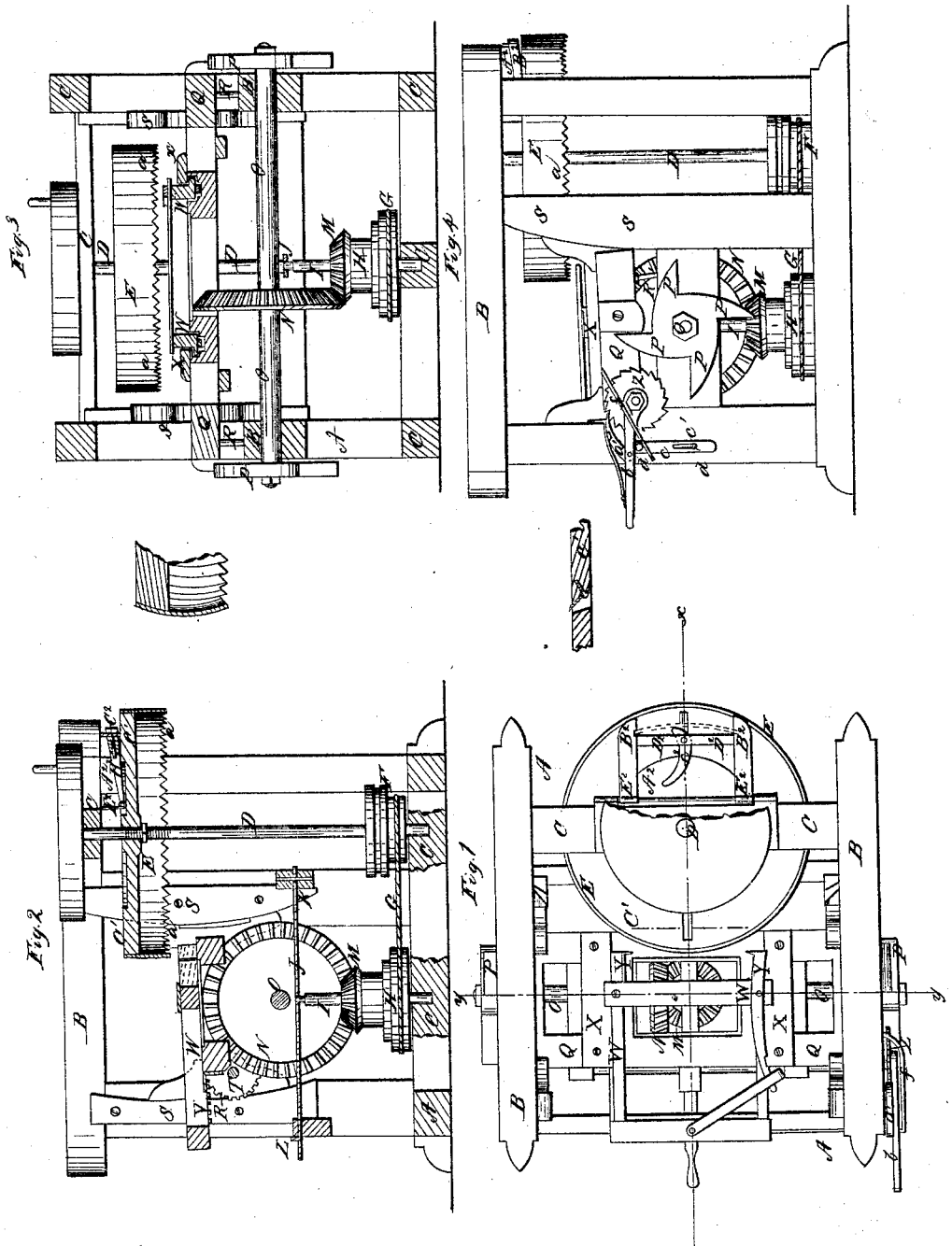

CHARLES MURDOCK, OF ELLENVILLE, NEW YORK.

IMPROVEMENT IN STAVE-MACHINES.

Specification forming part of Letters Patent No. 55,695, dated June 19, 1866; antedated June 2, 1866.

*To all whom it may concern:*

Be it known that I, CHARLES MURDOCK, of Ellenville, in the county of Ulster and State of New York, have invented new and useful Improvements in Stave-Machines; and I do hereby declare that the following is a full, clear, and exact description thereof, which will enable those skilled in the art to make and use the same, reference being had to the accompanying drawings, forming part of this specification.

The present invention principally relates to a machine for sawing and planing staves directly from blocks of wood, giving to them at the same time their proper curvilinear shape from end to end and their transverse convexity; and for this purpose it consists in the use of a saw-blade bent into the form of a complete circle, or a portion of the same, corresponding to the curve which the staves are to have, and of a similar transverse convex shape, to which saw-blade a continuous rotary or other suitable movement is imparted, so that when the block is properly presented to its cutting-edge it shall be severed or cut by the saw into the staves corresponding in shape to that of the saw both in its length and width.

In connection with such saw-blade, made of the form above described, I use a carriage for the block to the same, so arranged and operated that at suitable times it will raise the block toward the saw to be sawed thereby, and when so sawed withdraw the same therefrom, when the block is fed along upon the carriage by means of a peculiar arrangement of feed devices operated by the downward movement of the carriage, which forms also a part of the present invention, so that as the carriage travels up toward the saw again the block shall be presented to its edge, the thickness to which the staves are sawed being regulated by simply adjusting the feed devices according to that desired. The block-carriage moves within guides having the proper curvilinear direction to raise the block to the saw-blade in such a manner that the saw shall not in the least degree bind in its operation, which would occur were the block fed straight to the saw, owing to the convex shape of the latter.

In accompanying plate of drawings my improvements are represented.

Figure 1 is a plan or top view; Fig. 2, a central longitudinal vertical section taken in the plane of the line $x\ x$, Fig. 1; Fig. 3, a transverse vertical section taken in the plane of the line $y\ y$, Fig. 2; Fig. 4, an end view.

A A in the drawings represent the frame-work of the machine, consisting of two parallel frames, B B, supported and strengthened by cross braces or bars C C C at suitable points or parts thereof; D, an upright or vertical shaft, turning at each end in bearings of the cross-bars C C, on the horizontal wheel or frame C' of which is secured the upper edge of a saw-blade, E, bent into the form of a circle, with its lower edge, $a$, projecting below the wheel C' and serrated with a series of teeth for its whole length of the proper shape and size. The diameter of this saw-blade it is intended to have correspond to the diameter of the curve which the staves are to have in the direction of their length, so that when the block from which the staves are to be sawed is fed to the same, as will be hereinafter particularly explained, each stave, as it is cut thereby, will have the desired curvilinear shape in the direction of their length.

On the lower end of shaft D is a horizontal pulley, F, from which passes a connecting-belt, G, to another pulley, H, upon the lower end of a short vertical shaft, I, turning in bearings at its lower end of the cross-brace C and at its upper in a horizontal swinging arm, J, hung at its inner end, K, and secured or held in position at its outer end by a lever-catch, L, upon the outside of the frame-work. On this shaft I, at or near its upper end, is a small bevel-gear wheel, M, engaging with a similar but larger bevel-gear wheel, N, of the transverse horizontal shaft O, turning in bearings at each end of the parallel standard-frames B B, before referred to, and with a series of cams, P P P, of an equal number and similar in shape and size, upon each end, which cams in turn, as the shaft is revolved, abut against and raise the horizontal frame Q extending across the frame-work of the machine and resting at each end upon pins R R, and moving when raised in and between guide-cleats S S of the frame-work.

T is a horizontal shaft extending across one end of the frame Q, in which it has bearings at each end; U U, two small cog or gear wheels on shaft T, each of which engages with a toothed rack-bar, V, in the under side of a supplementary frame, W, of the main frame Q, moving in and between guides or cleats X X of the same in a transverse direction to its length and toward the cylinder saw-blade; Y Y', two jaws at the inner end of the frame W, one of which, Y', is fixed and the other movable and adjustable, in and between which jaws the block of wood from which the staves are to be cut is held while submitted to the action of the saw-blade, as will be presently described.

On outer end of shaft T is a ratchet-wheel, Z, with the teeth of which engages the spring-pawl $a'$, hung upon a swinging arm, $b$, of the said shaft. $c$ is a plate fixed in a vertical position upon the same end of the framework with the ratchet Z, with a stud or pin, $d$, at its upper end, upon which rests the arm $b$, said plate being susceptible of adjustment so as to bring its stud to a higher or lower plane by means of a slot, $c'$, and set-screw $d$. $f$ is a fixed arm on frame Q, extending from the same to and under the swinging arm $b$, before referred to.

From the above arrangement it is obvious that each time the frame Q is lifted or raised by the cams P, the ratchet-wheel traveling in common with the same, its pawl necessarily drops over the teeth of the ratchet until the fixed arm $f$ abuts against the swinging arm $b$, to which the pawl is hung, which arm $b$ then, for the remainder of the upward movement of the frame, travels in common with it, the pawl as the frame travels downward falling in common with it until its arm comes to a stop against its rest-pin $d$, when for the remainder of the movement the pawl remains stationary, thus proportionally rotating the ratchet, and through the shaft T, to which it is secured, and gear-wheels $u$ $u$, feeding the frame in which the block of wood is held, as described, in a direction toward the saw.

It is manifest that the feeding of the block to the saw-blade can be regulated at pleasure by simply raising or lowering the rest-pin for the pawl-arm $b$, for by that means the stop to the downward movement of the said arm in unison with the frame can be produced at any point or part of its play, thus causing the pawl to act through a greater or lesser number of teeth, according as may be desired, and as is evident without further explanation.

The block of wood from which the stave is to be cut or sawed is first placed in the machine in and between the holding-jaws Y Y', as before explained, when, by imparting motion to the vertical shaft D through a belt and pulley, or in any other proper manner, a rotary movement is imparted to the saw-blade E, while at the same time, through the connecting devices above specified, the frame in which the supplementary block-holding frame is arranged is caused to be lifted up toward the saw, bringing the block in contact therewith, by which a stave is cut or severed from the same, when the frame falling, as the cam P disengages itself from it, the block-frame is then actuated toward the saw-blade through the ratchet-wheel, pawl, and connecting devices described, thus feeding the block to the saw, which as the main frame lifts is again cut, and so on until the entire block has been sawed, when a new one is inserted and the operation again proceeds as before.

The saw-blade across its width, or from its lower edge up toward the wheel or frame to which it is secured, is made of a convex shape, so that the stave, as it is sawed from the block, shall have the requisite convexity and concavity, the guide-cleats for the main block-frame. as well as the side pieces of the frame in contact therewith, being made also of the necessary curved shape to properly bring the block against the saw-blade as the frame lifts, so that no binding of the saw shall occur, which would result were a convex saw-blade used and the block fed straight to the same.

It is not necessary that the saw-blade should be convex in shape; but I deem it best, so as to give convexity to the staves sawed by it.

From the action of the saw herein described upon the block it is obvious that the saw cuts through the block in the direction of the grain, consequently acting also as a plane to the sides of the staves, leaving their surfaces sufficiently smooth and even for all practical purposes, and that this operation also requires less power than with machines sawing across the grain.

From the above description it will be seen that by my improved stave-cutting machine, the block of wood from which the staves are cut having been placed in the machine, it is automatically fed at the proper times to the saw-blade, and, furthermore, the thickness to which the staves are cut can be regulated at pleasure, the importance of which results are manifest to all conversant with stave-cutting machines.

The saw-blade, in lieu of having a continuous rotary motion, as described, may be arranged so as to have an oscillating rotary motion, and it may be made in sections similar or different in length, as may be deemed most desirable.

The staves, cut as above explained, are then jointed and made of a proper bilge proportionate to their respective widths by placing them in turn in a frame, $A^2$, across from and between its two jaws, $B^2$ $B^2$, when the center of the stave is sprung out through a cam-lever, $C^2$, hung in the cross-bar $D^2$ of the frame $A^2$. The frame is then hung by its inner end upon hooks $E^2$ of the cross-bar C of the frame-work above the saw frame or wheel, with the lower edge of the stave resting upon the wheel, the frame being inclined from its outer end to its inner end, or where it is hung, as explained, when, as the wheel revolves, the vertical radial knife-blade $F^2$ inserted in its face shaves the edge of the stave in contact with it, giving to it its tapering shape from the center to each end, or what is called the "bilge," and at the same time jointing it, as is evident without further explanation and by an inspection of the drawings.

By throwing out the center of the stave, as described, its bilge is produced, and in direct proportion thereto is the bilge made larger or smaller.

After having jointed one edge of the stave and tapered it, as explained, the frame is detached from the hooks and rehung thereon, but this time with the opposite or other edge upon the wheel, when the same operation takes place as before, thus jointing both of its sides. Each stave is submitted to this knife, first being, however, inserted in the frame and thrown out at the center, as explained.

It is obvious that several block-carriages may be used, if desired, with only one saw-blade, and also several jointing-frames may be used with one and a common knife-blade, and thus in both cases considerably increasing the effectiveness of the machine.

I claim as new and desire to secure by Letters Patent—

1. The block-carrying frame Q, with its supplementary frame W, arranged together substantially in the manner described, and operating with regard to the saw as and for the purpose specified.

2. The arrangement of the swinging arm b, with its spring-pawl, ratchet-wheel Z, adjustable plate C, and fixed arm f, connected through a pinion-and-rack gear or its equivalent with the block-carrying frame Q, and operating together substantially in the manner described, and for the purpose specified.

CHARLES MURDOCK.

Witnesses:
ALBERT W. BROWN,
C. L. E. TOPLIFF.